US012104967B2

(12) United States Patent
Thevamaran et al.

(10) Patent No.: US 12,104,967 B2
(45) Date of Patent: Oct. 1, 2024

(54) ELECTROMECHANICAL FORCE SENSOR BASED ON EXTREMA DEGENERACY POINT WITH NONLINEAR RESPONSE

(71) Applicants: Wisconsin Alumni Research Foundation, Madison, WI (US); Wesleyan University, Middletown, CT (US)

(72) Inventors: Ramathasan Thevamaran, Madison, WI (US); Jizhe Cai, Madison, WI (US); Tsampikos Kottos, Farmington, CT (US); Fred Ellis, Middletown, CT (US); Rodion Kononchuk, Meriden, CT (US)

(73) Assignee: Wisconsin Alumni Research Foundation, Madison, WI (US)

( * ) Notice: Subject to any disclaimer, the term of this patent is extended or adjusted under 35 U.S.C. 154(b) by 401 days.

(21) Appl. No.: 17/681,320

(22) Filed: Feb. 25, 2022

(65) Prior Publication Data

US 2023/0273077 A1 Aug. 31, 2023

(51) Int. Cl.
    *G01L 1/14* (2006.01)
(52) U.S. Cl.
    CPC ................... *G01L 1/142* (2013.01)
(58) Field of Classification Search
    CPC ................ G01L 1/142; G01L 1/144
    See application file for complete search history.

(56) References Cited

U.S. PATENT DOCUMENTS

| 7,768,262 B2 * | 8/2010 | Schiano | G01R 33/441 324/309 |
| 8,278,784 B2 * | 10/2012 | Cook | H01Q 7/00 307/149 |
| 9,929,704 B2 * | 3/2018 | Mayo | H04B 5/26 |
| 10,446,317 B2 * | 10/2019 | Hall | B60L 53/51 |
| 11,677,379 B2 * | 6/2023 | Doll | H03H 9/1057 310/346 |
| 2013/0099789 A1 * | 4/2013 | Benslimane | G01R 33/3635 324/322 |

(Continued)

FOREIGN PATENT DOCUMENTS

| DE | 102011006157 B4 * | 6/2016 | ....... G01R 33/34076 |
| RU | 2456719 C1 * | 7/2012 | |

(Continued)

*Primary Examiner* — Octavia Hollington
(74) *Attorney, Agent, or Firm* — Cooper Legal Group LLC

(57) ABSTRACT

One or more computing devices, systems, and/or methods are provided. In an example, a method includes tuning a sensor comprising a first resonator having an effective gain, a second resonator having an effective loss, and a coupling circuit connected between the first resonator and the second resonator at an extrema degeneracy point with a nonlinear response to a force applied to the sensor. At least one of the first resonator, the second resonator, or the coupling circuit comprises a variable capacitor having a capacitance that varies as a function of the force. The method comprises injecting an input signal into one of the first resonator or the second resonator, receiving an output signal from one of the first resonator or the second resonator, and determining a magnitude of a force based on a difference between a first frequency extrema point and a second frequency extrema point in the output signal.

20 Claims, 10 Drawing Sheets

(56) References Cited

U.S. PATENT DOCUMENTS

2013/0278075 A1* 10/2013 Kurs ..................... H04B 5/79
                                                        307/104
2018/0219419 A1*  8/2018 Ettes .................... H04B 5/266

FOREIGN PATENT DOCUMENTS

| WO | WO-2016108771 A1 * | 7/2016 | ............. G01K 11/26 |
| WO | WO-2022202773 A1 * | 9/2022 | ............... A61B 5/00 |

* cited by examiner

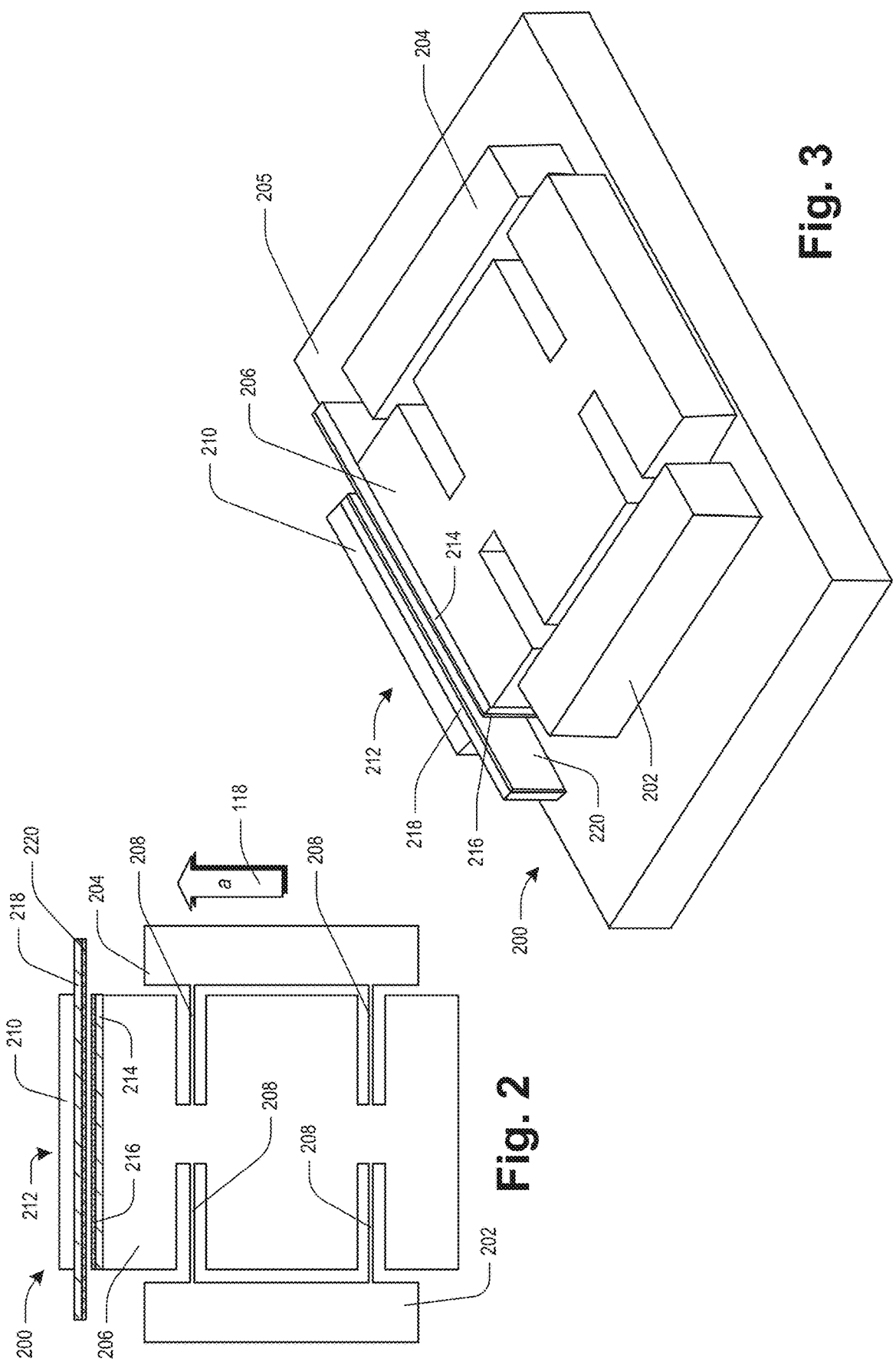

ELECTROMECHANICAL FORCE SENSOR BASED ON EXTREMA DEGENERACY POINT WITH NONLINEAR RESPONSE

This invention was made with government support under 1925530 and 1925543 awarded by the National Science Foundation and under N00014-19-1-2480 awarded by the NAVY/ONR. The government has certain rights in the invention.

BACKGROUND

Force sensors, such as accelerometers, inclinometers, vibrometers, gyroscopes, or other force sensors, are employed in various applications, such as avionics, automobiles, industrial machinery, electronic devices, or other situations. Increasing the sensitivity of a sensor may also increase the noise registered by the sensor.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a sensor is provided. The sensor comprises a first resonator having an effective gain, a second resonator having an effective loss, a coupling circuit connected between the first resonator and the second resonator, and a processing unit. At least one of the first resonator, the second resonator, or the coupling circuit comprises a variable capacitor having a capacitance that varies as a function of a force applied to the variable capacitor. The processing unit is configured to tune the first resonator and the second resonator at an extrema degeneracy point with a nonlinear response to the force, inject an input signal into the first resonator or the second resonator after tuning the first resonator and the second resonator at the extrema degeneracy point, receive an output signal from the first resonator or the second resonator, the output signal having a first frequency extrema point and a second frequency extrema point, and determine a magnitude of the force based on a difference between the first frequency extrema point and the second frequency extrema point.

In an embodiment of the techniques presented herein, a method comprises tuning a sensor comprising a first resonator having an effective gain, a second resonator having an effective loss, and a coupling circuit connected between the first resonator and the second resonator at an extrema degeneracy point with a nonlinear response to a force applied to the sensor. At least one of the first resonator, the second resonator, or the coupling circuit comprises a variable capacitor having a capacitance that varies as a function of the force. The method comprises injecting an input signal into one of the first resonator or the second resonator after tuning the sensor at the extrema degeneracy point, receiving an output signal from one of the first resonator or the second resonator, the output signal having a first frequency extrema point and a second frequency extrema point, and determining a magnitude of a force based on a difference between the first frequency extrema point and the second frequency extrema point.

In an embodiment of the techniques presented herein, a non-transitory computer-readable medium stores operations that when executed by a processing unit cause the processing unit to tune a sensor comprising a first resonator, a second resonator, and a coupling circuit connected between the first resonator and the second resonator at an extrema degeneracy point with a nonlinear response to a force applied to the sensor. At least one of the first resonator, the second resonator, or the coupling circuit comprises a variable capacitor having a capacitance that varies as a function of the force. The operations cause the processing unit to inject an input signal into one of the first resonator or the second resonator after tuning the sensor at the degeneracy point, receive an output signal from one of the first resonator or the second resonator, the output signal having a first frequency extrema point and a second frequency extrema point, and determine a magnitude of the force based on a difference between the first frequency extrema point and the second extrema point.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIGS. 2 and 3 are diagrams of a uni-directional variable capacitor, in accordance with some embodiments.

DETAILED DESCRIPTION

Figure 1:
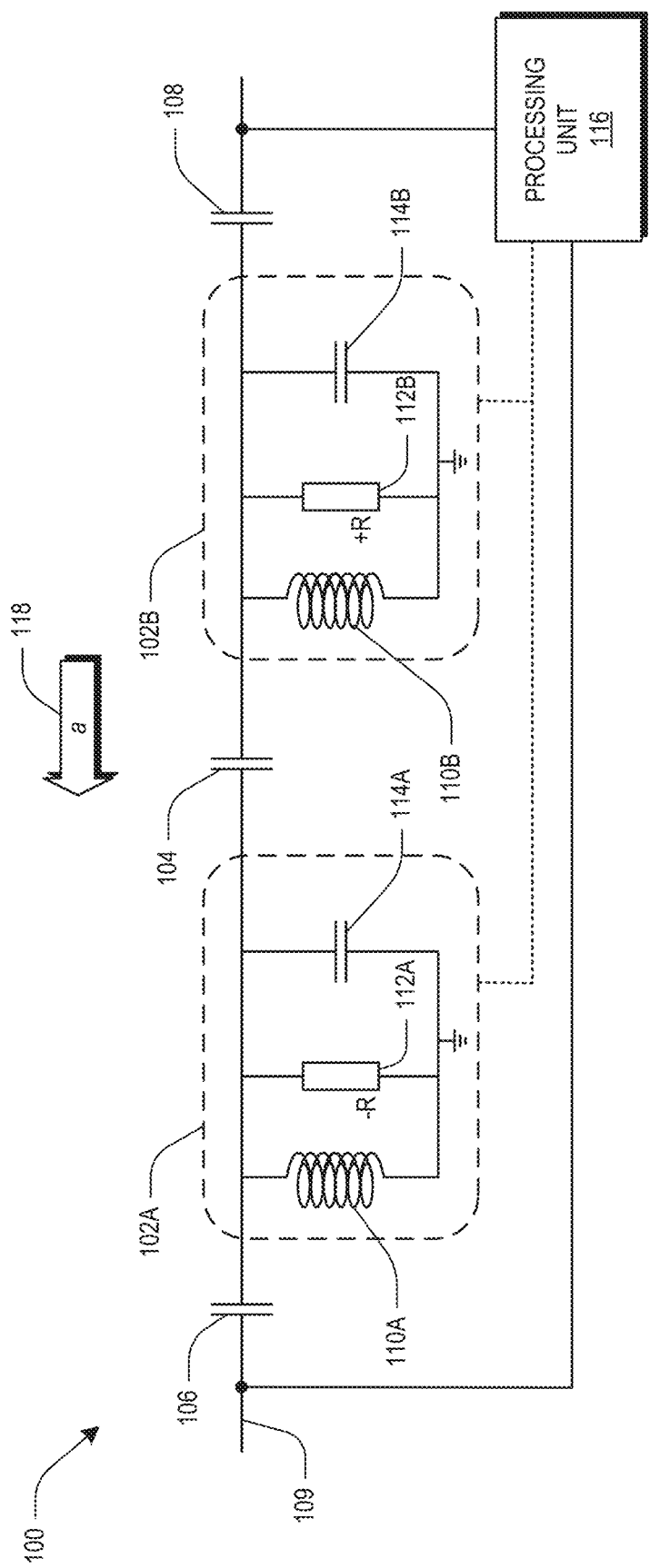
FIG. 1 is a diagram illustrating a sensor, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

FIG. 1 is a diagram illustrating a sensor 100, in accordance with some embodiments. The sensor 100 comprises a first resonator 102A coupled to a second resonator 102B by a coupling circuit 104. The coupling circuit 104 may comprise a capacitor (as shown in FIG. 1), an inductor, or a capacitor and an inductor. A first capacitor 106 is coupled to the first resonator 102A, and a capacitor 108 is coupled to the second resonator 102B. In some embodiments, the resonators 102A, 102B, the coupling circuit 104, and the capacitors 106, 108 define a transmission line 109. The first resonator 102A comprises an effective inductance 110A, an effective negative gain unit 112A, and an effective capacitance 114A. The second resonator 102B comprises an effective inductance 110B, an effective positive gain unit 112B, and an effective capacitance 114B. The effective devices 110A, 110B, 112A, 112B, 114A, 114B may comprise additional circuit elements that combine to create the values of the effective devices 110A, 110B, 112A, 112B, 114A, 114B within the resonators 102A, 102B. In some embodiments, the gain units 112A, 112B are implemented using operational amplifiers.

In some embodiments, a processing unit 116 is coupled to the transmission line 109. The processing unit 116 injects an input signal into the transmission line 109 and measures an output signal resulting from the input signal. At least one of the resonators 102A, 102B, or the coupling circuit comprises a variable capacitor that is sensitive to a force 118 applied to the sensor 100. The processing unit 116 measures the applied force based on the output signal. In some embodiments, the output signal is a signal exiting the transmission line 109 from the opposite end that received the input signal. In some embodiments, the output signal is a reflectance signal that is measured on the same end of the transmission line 109 that received the input signal.

FIGS. 2 and 3 are diagrams of a uni-directional variable capacitor 200, in accordance with some embodiments. The variable capacitor 200 comprises stationary members 202, 204 mounted to a base 205 and connected to a body member 206 by one or more springs 208 that allow movement of the body member 206 in the direction of the applied force 118. A stationary member 210 is mounted to the base 205 adjacent the body member 206. A sensing unit 212 of the variable capacitor 200 comprises a first dielectric layer 214 over the body member 206 and a first conductive plate 216 over the first dielectric layer 214. A second dielectric layer 218 is over the stationary member 210 and a second conductive plate 220 is over the second dielectric layer 218. In some embodiments, the stationary members 202, 204, 210, and the body member 206 comprise copper, or some other conductive material. In some embodiments, the dielectric layers 214, 218 comprise glass or some other dielectric material. In some embodiments, the conductive plates 216, 220 comprise gold or some other conductive material. In some embodiments, the conductive plates 216, 220 are spaced apart, such as by an air gap. A flexible dielectric material may be provided between the conductive plates 216, 220 that allows relative movement between the conductive plates 216, 220. The spacing between the conductive plates 216, 220 affects the capacitance of the sensing unit 212. The force 118 applied to the variable capacitor 200 changes the spacing between the conductive plates 216, 220 due to movement of the body member 206 relative to the stationary members 202, 204, 210 as allowed by the springs 208. The springs 208 return the body member 206 to its initial state when the force 118 is no longer present. Other structures and configurations of the variable capacitor 200 and the sensing unit 212 are within the scope of the present disclosure.

Figure 4:
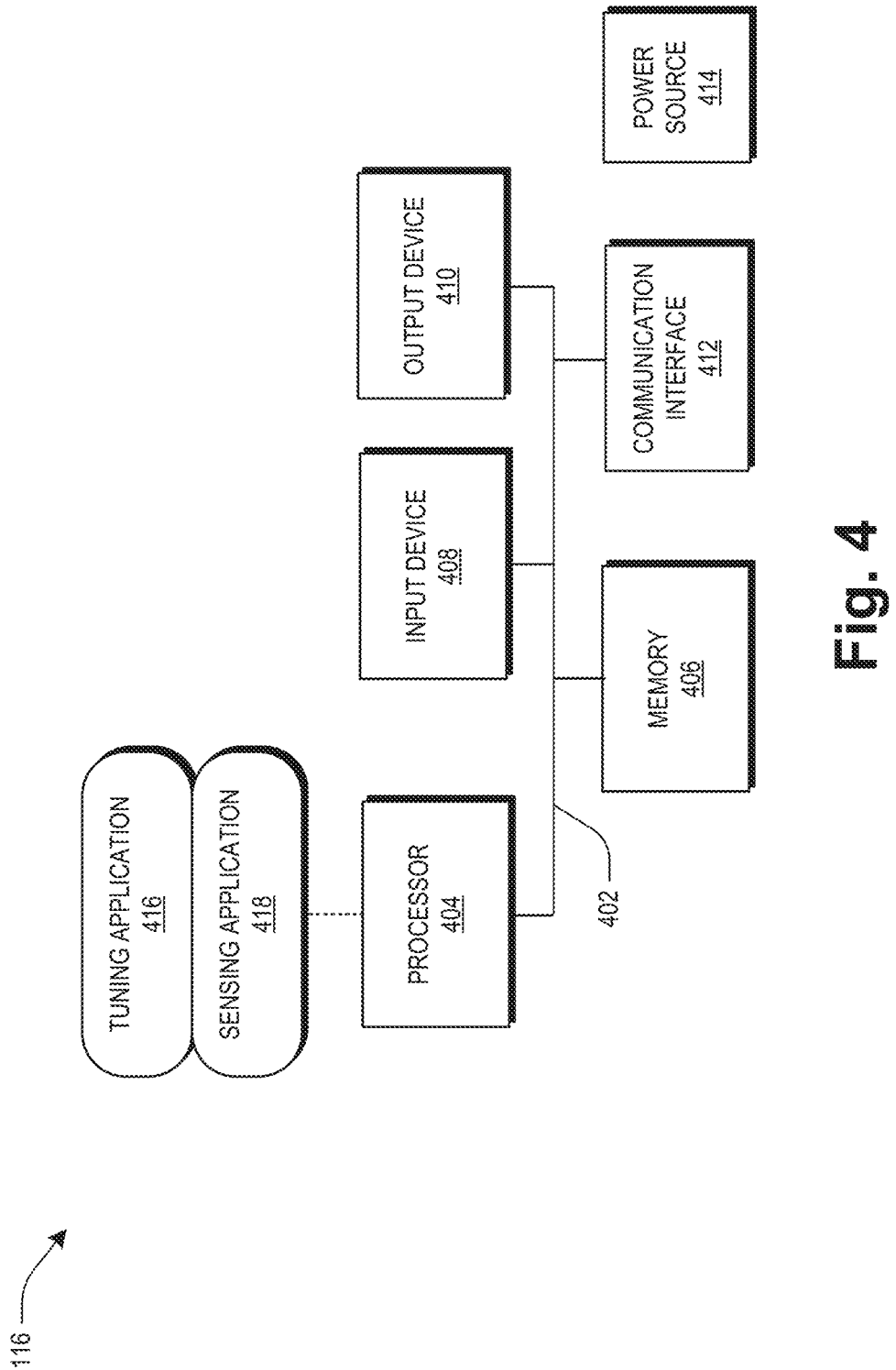
FIG. 4 is a diagram of the processing unit of the sensor, in accordance with some embodiments.

FIG. 4 is a diagram of the processing unit 116 of the sensor, in accordance with some embodiments. In some embodiments, the processing unit 116 comprises a bus 402, a processor 404, a memory 406 that stores software instructions or operations, an input device 408, an output device 410, a communication interface 412, and a power source 414, such as a battery. The processing unit 116 may include fewer components, additional components, different components, and/or a different arrangement of components than those illustrated in FIG. 4.

According to some embodiments, the bus 402 includes a path that permits communication among the components of the processing unit 116. For example, the bus 402 may include a system bus, an address bus, a data bus, and/or a control bus. The bus 402 may also include bus drivers, bus arbiters, bus interfaces, clocks, and so forth. The processor 404 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 404 may be implemented as hardware (e.g., a microprocessor, etc.), a combination of hardware and software (e.g., a SoC, an ASIC, etc.), may include one or multiple memories (e.g., cache, etc.), etc.

In some embodiments, the processor 404 controls the overall operation or a portion of the operation(s) performed by the sensor 100. The processor 404 performs one or multiple operations based on an operating system and/or various applications or computer programs (e.g., software). The processor 404 accesses instructions from the memory 406, from other components of the processing unit 116, and/or from a source external to the sensor 100 (e.g., a network, another device, etc.). The processor 404 may perform an operation and/or a process based on various techniques including, for example, multithreading, parallel processing, pipelining, interleaving, etc.

In some embodiments, the memory 406 includes one or multiple memories and/or one or multiple other types of storage mediums. For example, the memory 406 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory. The memory 406 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The memory 406 may include drives for reading from and writing to the storage medium. The memory 406 may be external to and/or removable from sensor 100, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The memory 406 may store data, software, and/or instructions related to the operation of the sensor 100.

The communication interface 412 permits the sensor 100 to communicate with other devices, networks, systems, sensors, and/or the like on a network. The communication interface 412 may include one or multiple wireless interfaces and/or wired interfaces. For example, the communication interface 412 may include one or multiple transmitters and receivers, or transceivers. The communication interface 412 may operate according to a protocol stack and a communication standard. In some embodiments, the communication interface 412 includes an antenna. The communication interface 412 may include various processing logic or circuitry (e.g., multiplexing/de-multiplexing, filtering, amplifying, converting, error correction, etc.). In some embodiments, the communication interface 412 operates using a long range wireless protocol, such as a cellular protocol or a WiFi protocol, a short range protocol, such as BLUETOOTH™, or a wired protocol, such as Ethernet.

In some embodiments, the input device 408 permits an input into the sensor 100. For example, the input device 408 may comprise a keyboard, a mouse, a display, a touchscreen, a touchless screen, a button, a switch, an input port, speech recognition logic, and/or some other type of suitable visual, auditory, or tactile input component. The output device 410 permits an output from the sensor 100. For example, the output device 410 may include a speaker, a display, a touchscreen, a touchless screen, a projected display, a light, an output port, and/or some other type of suitable visual, auditory, or tactile output component.

In some embodiments, the processing unit 116 executes a tuning application 416 that allows automatic or user-guided tuning of the sensor 100, such as adjusting one or more of the effective values of the resonators 102A, 102B or the coupling circuit 104, and a sensing application 418 that facilitates sensor measurements. For example, the sensing application 418 may control the injecting of the input signal and the measuring of the force 118 based on the output signal.

The sensor 100 operates on the principle of an exceptional point. A exceptional point (EP) is a non-Hermitian spectral degeneracy where both eigenvalues and their corresponding eigenvectors coalesce. Operation near an EP increases the responsivity of the sensor 100 due to the abrupt resonant detuning occurring in the proximity to the EP. The sensor 100 implements an EP-based parity time ($\mathcal{PT}$) symmetric electromechanical sensor that suppresses enhanced technical noise by enhanced responsivity to applied accelerations. The fundamental noise is mitigated by exploiting the detuning from an extrema degeneracy point with a nonlinear response to the force. The extrema degeneracy point may be a transmission peak degeneracy (TPD) when the output signal is a transmission signal. The degeneracy point may be a reflectance peak degeneracy (RPD) or a reflectance deep degeneracy (RDD) when the output signal is a reflectance signal. For ease of illustration, the following example discusses a TPD. A TPD forms when the sensor 100 is weakly coupled to the transmission line 109 as a sensitivity measurant. The TPD occurs at a particular frequency and controlled parameters for which the bi-orthogonal eigenbasis is still complete and are distinct from the EP.

EPs are spectral degeneracies occurring in the parameter space of an open (non-Hermitian) system where two N=2 (or more) eigenfrequencies and their corresponding eigenvectors coalesce. An EP induces a sublinear detuning of the resonant frequencies from the EP degeneracy when the system interacts with a perturbing agent, such as an applied force. Specifically, in the proximity of an N-th order EP, the degenerate resonances abide to Puiseux generalized expansions leading to a resonance detuning $\Delta f \equiv |f - f_{EP}|$ that follows a nonlinear behavior, such as an N-th root behavior $\Delta f \sim \epsilon^{1/N}$ with respect to the perturbation strength $\epsilon$ imposed to the system by the presence of the perturbing agent, for example, the applied force. In the small perturbation limit, this sublinear response provides an enhanced sensing as compared to a linear response ($\Delta f \sim \epsilon << \epsilon^{1/N}$) in a sensing scheme that relies on Hermitian degeneracies.

The sensor 100 operates based on the distinction between EP and the TPDs observed in the transmission spectrum observed after interrogation via a weakly coupled transmission line 109. The corresponding differential transmission peaks detuning $\Delta f$ from the TPD follows a square-root behavior with respect to the applied force 118, a, and has a detune rate slightly larger than the rate appearing in the resonant modes detuning near EPs. While the TPD is a consequence of the underlying EP, it occurs at different parameter values of the sensor 100 where the eigenbasis is still complete; thus the performance of the sensor is not influenced by excess noise effects that are rooted to the eigenbasis collapse. However, at the proximity of the TPD, the Peterman Factor (PF) remains finite and smaller than a sensitivity enhancement factor (SEF) of the sensor measuring the responsivity of the sensor 100 to acceleration variations. It has been determined theoretically that the PF is directly proportional to the technical noise due to the coupling with the transmission line and the noise generated by the gain/loss elements used to create the EP-singularity. Corresponding noise enhancement factors describing the noise power enhancements remain finite in the proximity of the TPD and are surpassed by the SEF of the transmission peaks detuning near the TPD.

Referring to FIG. 1, the resonators 102A, 102B are capacitively coupled, $\mathcal{PT}$ symmetric RLC resonators with a natural frequency, $$f_0 = \frac{1}{2\pi} \frac{1}{\sqrt{LC}} \approx 2.68 \text{ MHz}$$

and capacitive coupling $C_c$ provided by the coupling circuit 104. The PT-symmetry condition is achieved when the gain of the negative gain unit 112A, $-R$, and the gain of the positive gain unit 112B, $+R$, are delicately balanced, and the reactive components provided by the effective inductors 110A, 110B and the effective capacitors 114A, 114B satisfy mirror symmetry, where the impedances of the active and passive circuit tanks, multiplied by i, are complex conjugates of each other at the frequency of interest.

When the capacitive coupling is above a critical value $C_c^{EP}$, the system is in so-called exact phase where the corresponding normal modes are also eigenvectors of the $\mathcal{PT}$-symmetric operator. In the opposite limit (small coupling) the system is in the broken phase where the normal modes are no longer eigenmodes of the $\mathcal{PT}$ symmetric operator. In the latter case, the eigenfrequencies appear as a complex conjugate pair, while in the former domain they are real-valued. The two phases are separated by an EP singularity of order=2. The resonators 102A, 102B are coupled to the transmission line 109 by the capacitors 106, 108 having capacitances, $C_e$.

Figure 5:
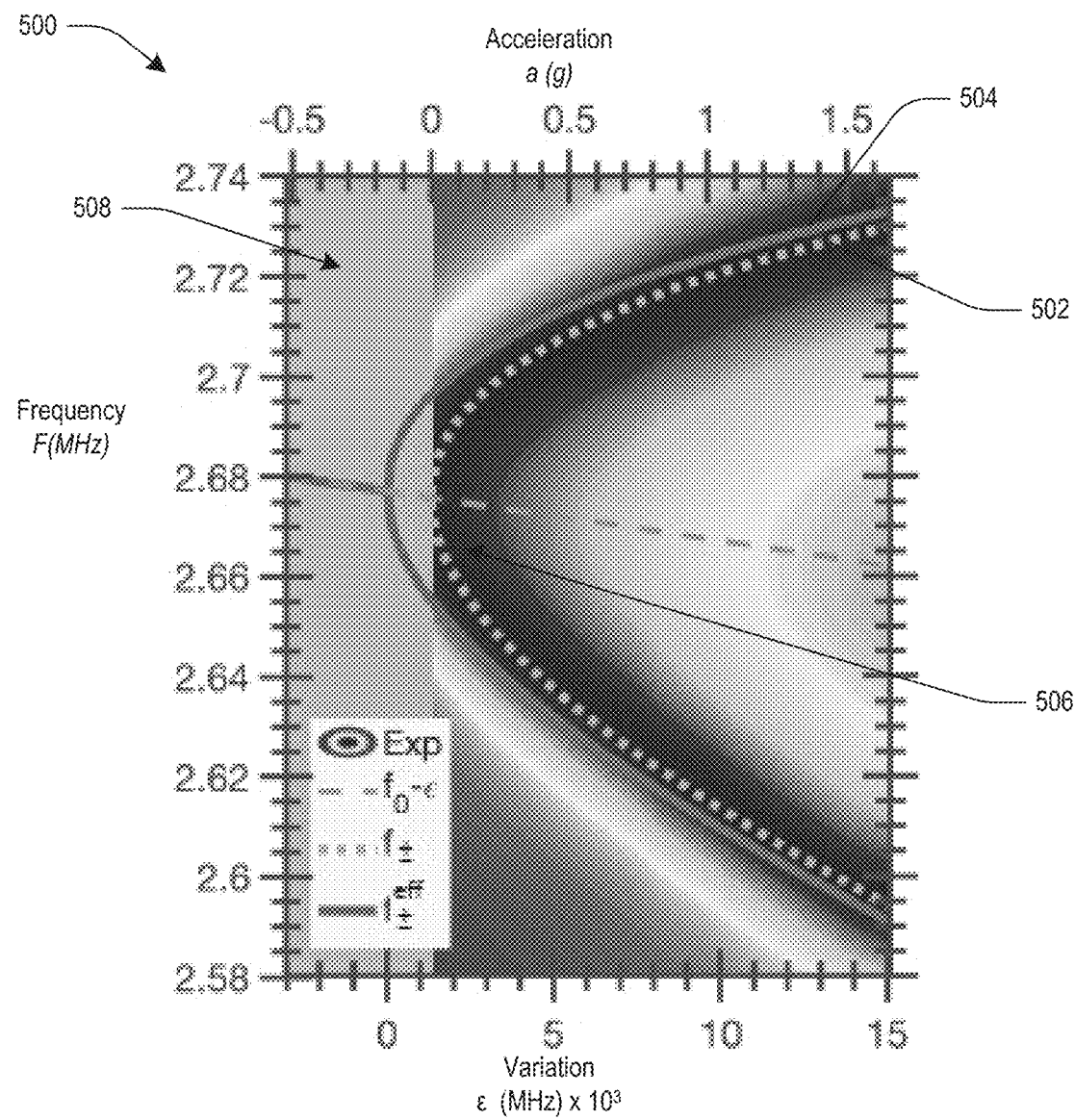
FIG. 5 is a diagram illustrating a density plot of the measured normalized transmittance spectrum as a function of acceleration, a, in accordance with some embodiments.

FIG. 5 is a diagram illustrating a density plot of the measured normalized transmittance spectrum as a function of acceleration, a, in accordance with some embodiments. In the density plot shown in FIG. 5, the measured (normalized) transmittance spectrum, T(f; a), versus the applied differential in-plane acceleration, a, is shown. At a=0, the transmission spectrum demonstrates a transmission peak degeneracy (TPD) which reflects the nearby EP degeneracy of the eigenfrequencies of the isolated system (corresponding to $C_e$=0). The system is initially set at TPD conditions with the conductive plates 216, 220 of the sensing unit 212 being at a distance d≈20 µm from one another corresponding to $C_c^{TPD}$≈50 pF. As the applied differential in-plane acceleration, a, increases, the capacitive coupling detunes from its equilibrium value, $C_c^{TPD}$, due to a displacement of the body member 206 to a new equilibrium position. The working principle of the sensor 100 relies on detecting concomitant transmission peak shifts from the TPD due to the capacitive coupling detuning from $C_c^{TPD}$. The transmittance develops two equihight peaks which bifurcate from the TPD following a characteristic square-root behavior, as indicated by the line 502, evaluated using a coupled mode theory, expected from the Puiseux expansion of resonance frequencies around an EP represented by the line 504.

To tune the sensor 100 to operate along the line 502 the following set of conditions is satisfied:

$$\begin{cases} \omega_1 = \omega_2 \equiv \omega_0 \\ \gamma_{e_1} = \gamma_{e_2} \equiv \gamma_e \\ \gamma_1 = \gamma_2 \equiv \gamma_0 \\ \gamma_0 > \gamma_e \end{cases}$$

where the resonant frequencies of the resonators 102A, 102B are:

$$\omega_1 = \sqrt{\frac{1}{L_1 C_1}} \text{ and } \omega_2 = \sqrt{\frac{1}{L_2 C_2}},$$

the gain of the first resonator 102A is:

$$\gamma_1 = \frac{1}{R_1} \sqrt{\frac{L_1}{C_1}} a,$$

and the loss of the second resonator 102B is:

$$\gamma_2 = \frac{1}{R_2} \sqrt{\frac{L_2}{C_2}}.$$

Coupling strength parameters to the left and right portions of the transmission line 109 are:

$$\gamma_{e1} = Z_0 \sqrt{\frac{C_1}{L_1}} \frac{C_e^2}{C_1^2} \text{ and}$$

$$\gamma_{e2} = Z_0 \sqrt{\frac{C_2}{L_2}} \frac{C_e^2}{C_2^2},$$

where $Z_0$ is the impedance of the transmission line 109.

The above set conditions can be rewritten as:

$$\begin{cases} L_2 = L_2 \equiv L \\ C_1 = C_2 \equiv C \\ R_1 = R_2 \equiv R \\ C_{e1} = C_{e2} \equiv C_e \\ \frac{1}{R} > \frac{Z_0 C_e^2}{LC} \end{cases}$$

Coalescence of the line 502 takes place when:

$$\frac{C_c}{C} = \sqrt{\gamma_0^2 + \gamma_e^2} = \sqrt{\frac{1}{R^2} \frac{L}{C} + Z_0^2 \frac{C_e^4}{LC^3}}.$$

Figure 6A:
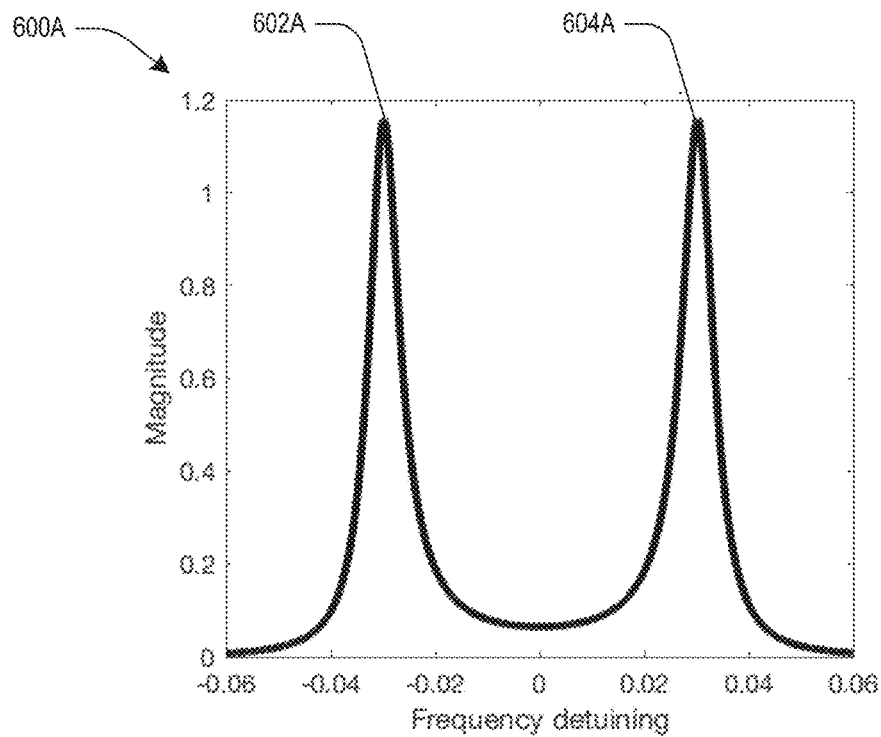
FIGS. 6A and 6B are diagrams illustrating sensor response, in accordance with some embodiments.
Figure 6B:
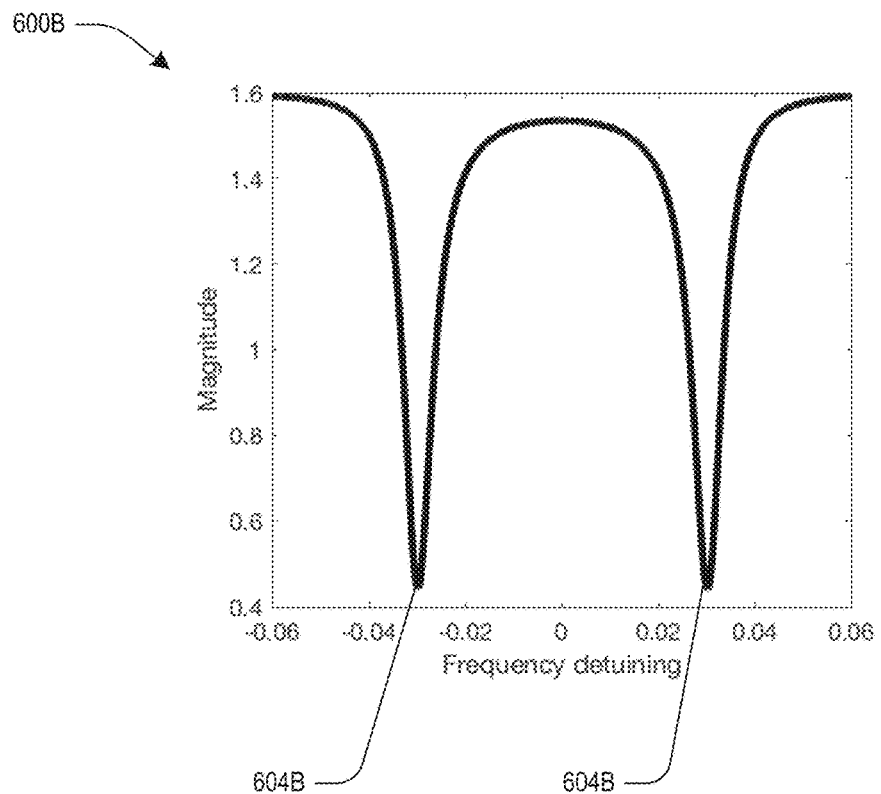

FIGS. 6A and B are diagrams illustrating the response of the sensor 100 for a particular applied acceleration, in accordance with some embodiments. FIG. 6A is a curve 600 illustrating the response for a transmission peak degeneracy where the output signal is measured at the end of the transmission line 109 opposite the end that the input signal was applied. The difference between the frequency peaks 602A, 604A is related to the applied force. Note that a reflectance peak curve generated where the output signal is a reflectance signal is similar to the transmission peak curve of FIG. 6A. FIG. 6B is a curve 600B illustrating the response for a reflectance deep degeneracy where the output signal is measured at the same end of the transmission line 109 as the end that the input signal was applied. The difference between the frequency deeps 602B, 604B is related to the applied force.

The weak coupling with the transmission line 109, together with the active nature of the sensor 100, are reflected in the high intensity value of the transmittance peaks and in the narrow form of the linewidths (see confined dark area 506). These attributes enhance the readout and boost the sensing resolution, allowing identification of the trajectories of the transmission peaks. The area 508 indicates the displacement values of the conductive plates 216, 220 of the sensing unit 212 for which the transmission peaks acquire extremely large values triggering saturable nonlinearities.

The measurements are illustrated based on a theoretical analysis using the framework of coupled mode theory (CMT), which was appropriately mapped to describe the $\mathcal{PT}$-symmetric circuit of the sensor 100. Specifically, the scattering matrix S that describes the open circuit, takes the form:

$$S = -I - iwG(f)W^T; G(f) = (H_{eff} - fI)^{-1}$$

where, I is the two-dimensional identity matrix and G(f) is the Green's function. The effective Hamiltonian $H_{eff}$ that describes the $\mathcal{PT}$-symmetric dimer coupled to the transmission lines is:

$$H_{eff} = H_0 - \frac{i}{2}W^T W; H_0 = \begin{pmatrix} f_0 - \epsilon + i\gamma_0 & \gamma_0 + \epsilon \\ \gamma_0 + \epsilon & f_0 - \epsilon - i\gamma_0 \end{pmatrix};$$

where the diagonal matrix $W_{nm}=\delta_{nm}\sqrt{2\gamma_e}$ models the coupling of the dimer with the transmission lines and $H_0$ is the Hamiltonian of the isolated dimer (corresponding to $\gamma_e=0$). For $\epsilon=\epsilon_{EP}=0$ the isolated system forms a second order (N=2) EP degeneracy at frequency $f_\pm^{(0)} \equiv f_{EP}=f_0$.

The transmittance is:

$$\mathcal{T}(f;a)=|S_{21}|^2.$$

By direct comparison with experimental data various parameters were determined for use in modeling the system. An estimate of the linewidth broadening of the resonances of the individual circuit tank, due to its coupling with the transmission line is $$\gamma_e \equiv Z_0 \sqrt{\frac{C}{L}} \left(\frac{C_e}{C}\right)^2 f_0 = 0.0206 \text{ MHz}.$$

Similarly, the variations at the coupling strength between the two resonant modes of the dimer, due to the displacement of the conductive plates 216, 220 of the sensing unit 212, when an acceleration a is imposed on the system, can be modeled by the parameter $\epsilon(a)=\epsilon_{TPD}+0.0082$ [MHz/g]·a. The coupling strength in the absence of any acceleration is $\epsilon_{TPD}=0.0013$ MHz—and is associated with the TPD. Finally, $\gamma_0=R^{-1}\sqrt{L/C}f_0=0.16$ MHz, is the gain/loss parameter describing the gain units 112A, 112B used in the $\mathcal{PT}$-symmetric circuit.

The frequencies $f_\pm(\epsilon)$ of the transmittance peaks, represented by the line 502 take the form:

$$f_\pm(\epsilon) = \begin{cases} f_0 - \epsilon \pm \sqrt{2\gamma_0\epsilon + \epsilon^2 - \gamma_e^2}, & \text{for } \epsilon \geq \epsilon_{TPD} \\ f_0 - \epsilon, & \text{for } \epsilon \leq \epsilon_{TPD} \end{cases}$$

where $\epsilon_{TPD}=-\gamma_0+\sqrt{\gamma_0^2+\gamma_e^2} \neq \epsilon_{EP}$. It was observed that $$\epsilon_{TPD} \approx \frac{\gamma_e^2}{2\gamma_0} \xrightarrow[\gamma_e \to 0]{} \epsilon_{EP} = 0$$

as expected. Accordingly, the TPD frequency is $$f_{TPD} \equiv f(\epsilon = \epsilon_{TPD}) = f_- = f_+ = f_0 - \epsilon_{TPD} \xrightarrow[\gamma_e \to 0]{} f_{EP} = f_0.$$

Furthermore, at the vicinity of $\epsilon_{TPD}$ the transmission peaks scale as:

$$f_\pm \propto f_{TPD} \pm \sqrt{2}\sqrt[4]{\gamma_0^2 + \gamma_e^2}\sqrt{\delta\epsilon}; \text{ provided that } \delta\epsilon \ll 2\sqrt{\gamma_0^2 + \gamma_e^2}$$

where $\delta\epsilon \equiv \epsilon-\epsilon_{TPD}$. The above square-root transmission peak splitting for small $\delta\epsilon$ is a direct consequence of the presence of the EP degeneracies of the eigenfrequencies $f_\pm^{(0)}$ of the isolated system (e.g. $\gamma_e=0$). The latter, can be evaluated by direct diagonalization of $H_0$, see Eq. and their functional dependence on $\epsilon$ is given by Eqs. by substituting $\gamma_e=0$. It is interesting to point out that the presence of $\gamma_e$ results in a slight enhancement of the detuning rate of $f_\pm$ as compared to the detuning rate of the resonant modes $f_\pm^{(0)}$.

To provide stability for the sensor 100, the lasing condition of the open circuit was determined. The stability is associated with the real poles of the scattering matrix occurring at:

$$f_L=f_0-\epsilon_L$$

where, $$\epsilon_L=-\gamma_0+\sqrt{\gamma_0^2-\gamma_e^2} < \epsilon_{EP}=0 < \epsilon_{TPD}.$$

At the lasing point $\mathcal{T}_{peak}(\epsilon \to \epsilon_L) \to \infty$. The divergence is characterized by a $\mathcal{T}_{peak}(\epsilon) \propto (\epsilon-\epsilon_L)^{-2}$ [$\mathcal{T}_{peak} \propto (\epsilon-\epsilon_L)^{-1}$] scaling, which applies in the range $\epsilon < \epsilon_{TPD}$ [$\epsilon > \epsilon_{TPD}$].

An enhanced transmitted intensity improves readability of the output signal and the identification of the transmission resonances. The sensing resolution is also an important factor. The sensing resolution is proportional to the linewidth $\Gamma$ of the transmission peaks. In the limit of very strong coupling $\epsilon \gg \gamma_0$, the $\mathcal{PT}$ nature of the sensor 100 can be ignored and the linewidth $\Gamma$ will be dictated by the coupling of the dimer with the transmission line 109. The linewidth $\Gamma$ is characterized by the coupling constant $\gamma_e$ which, in the present example, takes the value $\gamma_e \approx 0.02$ MHz. At the other limiting case of $\epsilon \to \epsilon_L$ a narrowing of the linewidth is expected. Although $\Gamma(\epsilon)$ remains essentially constant $\Gamma(\epsilon) \approx \gamma_e$ at the parameter range of the present example, a slight increase is identified in the proximity of $\epsilon_{TPD}$. Specifically, for $\delta\epsilon \equiv \epsilon-\epsilon_{TPD} \geq 0$ the linewidth takes the form $\tau(\delta\epsilon \to 0) \sim \sqrt{2}\gamma_e - \sqrt{2}(\gamma_e^2\gamma_0^2)^{1/4}\sqrt{\delta\epsilon}$. For $\delta\epsilon=0$, $\epsilon(\delta\epsilon=0)=\sqrt{2}\gamma_e$ indicating that the coupling of the circuit with the leads dictates the minimum measured uncertainty. On the other side of $\epsilon_{TPD}$ i.e. $\delta_\epsilon<0$ the linewidth behaves as $$\Gamma(\epsilon) \approx \frac{\sqrt{2}\gamma_e + \sqrt{2(\gamma_e^2+\gamma_0^2)}}{\gamma_e}\delta\epsilon.$$

This small $\delta\epsilon$ expansion persists even for $\epsilon \approx \epsilon_{EP}$ where $\Gamma(\epsilon=\epsilon_{EP}) \approx 0.7\gamma_e$. From this analysis, it is apparent that the uncertainty in the frequency splitting measurements in the proximity of the TPD is only slightly enhanced due to the linewidth increase confined to small values when the system operates in the weak coupling regime.

An advantage obtained by measuring the frequency splitting, since it is intrinsically self-referenced, is that there is no need for an external reference to suppress or eliminate frequency drift associated with other sources. The transmittance peaks splitting in the proximity of the TPD also follows a sublinear square-root behavior with respect to the perturbation 8E. Specifically, $\Delta f \equiv f_+ - f_- \propto \sqrt{\delta\epsilon}$, where $\delta\epsilon$ is a measurant proportional ($\sqrt{\delta\epsilon} \propto F$) to the applied force, F, or acceleration, a. In case of weak coupling to the transmission line 109, the upper limit of the sublinear sensing is predominantly controlled by $\gamma_0$. The extent of the sublinear domain in the sensor 100 is bounded by nonlinear capacitance effects occurring at small distances between the conductive plates 216, 220 of the sensing unit.

To determine the value of applied force or acceleration from the measured frequency splitting, the function:

$$\Delta f(F)=C\sqrt{F}$$

is evaluated to determine the value of the constant C. The constant, C, may be determined performing a calibration procedure on the sensor 100, resulting in the strict correspondence:

$$F(\Delta f) = \frac{(\Delta f)^2}{C}.$$

The sensor 100 may be applied to a variety of force sensing applications, such as to implement as accelerometers, an inclinometer, a vibrometers, a gyroscope, or another type of force sensor.

Figure 7:
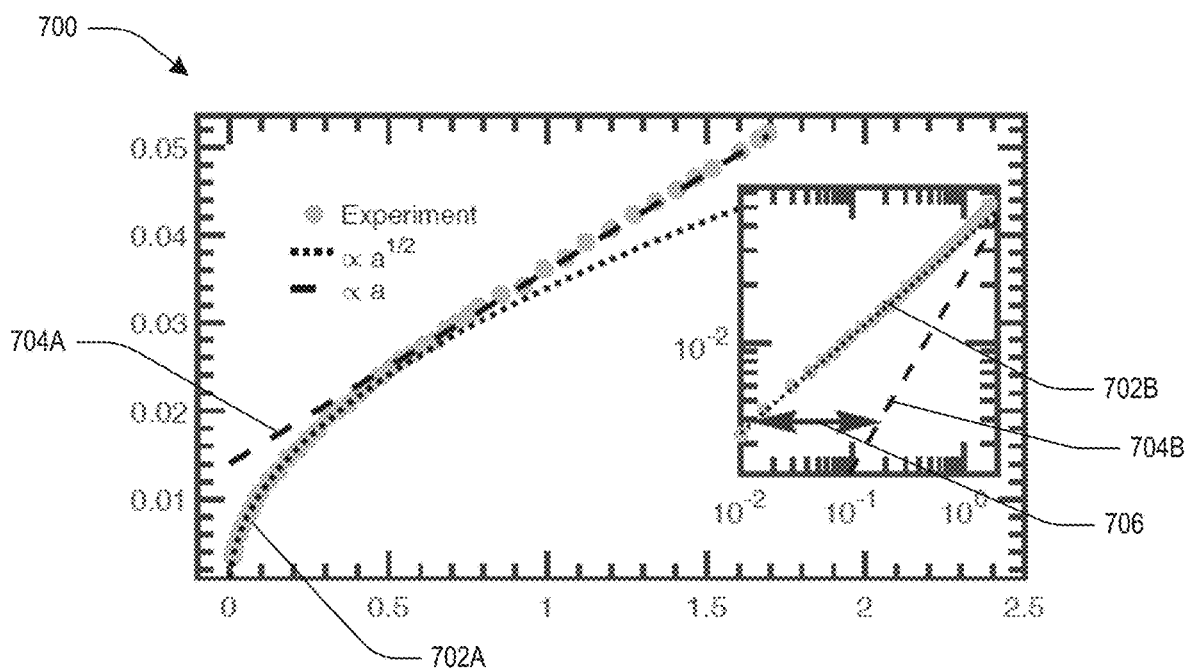
FIG. 7 is a diagram illustrating frequency splitting as a function of applied acceleration, in accordance with some embodiments.

FIG. 7 is a diagram 700 illustrating frequency splitting as a function of applied acceleration, a, in accordance with some embodiments. The curves 702A (linear plot) and 702B (logarithmic plot) show the nonlinear, or sublinear nature of the frequency splitting as a function of acceleration for the sensor 100, while the curves 704A (linear plot) and 704B (logarithmic plot) illustrate frequency splitting for a linear sensor. The sensor 100 demonstrates an order of magnitude enhancement of dynamic range, as compared to a linear sensors with the same upper bound of dynamical range, as represented by the arrow 706.

Figure 8:
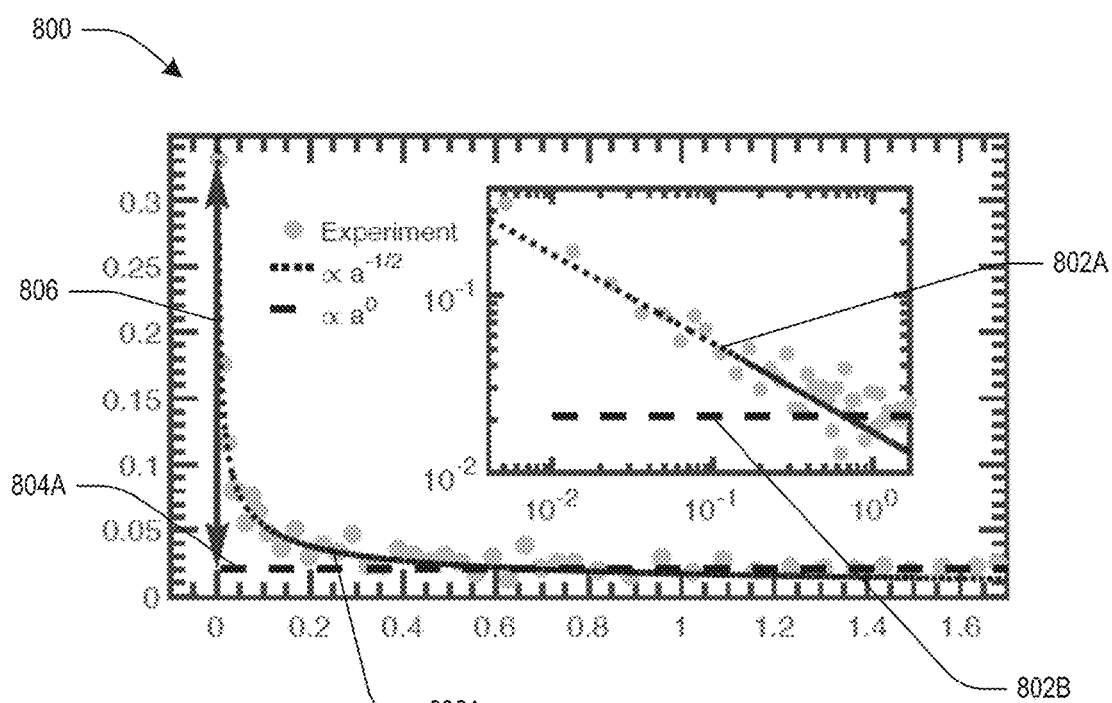
FIG. 8 is a diagram illustrating sensitivity as a function of applied acceleration, in accordance with some embodiments.

FIG. 8 is a diagram 800 illustrating sensitivity as a function of applied acceleration, a, in accordance with some embodiments. The sensitivity of the sensor 100 is given by:

$$\chi(\Delta f) = \frac{\partial(\Delta f/f_0)}{\partial a}.$$

In FIG. 8, the curves 802A (linear plot) and 802B (logarithmic plot) show the sensitivity of the sensor 100 as a function of acceleration, while the curves 804A (linear plot) and 804B (logarithmic plot) illustrate sensitivity a linear sensor. The sensitivity of the sensor 100 demonstrates an $\chi \sim 1/\sqrt{a}$ divergence in the proximity of the TPD. The sensor 100 demonstrates an order of magnitude enhancement of sensitivity, as compared to a linear sensors with the same upper bound of dynamical range, as represented by the arrow 806.

Figure 9:
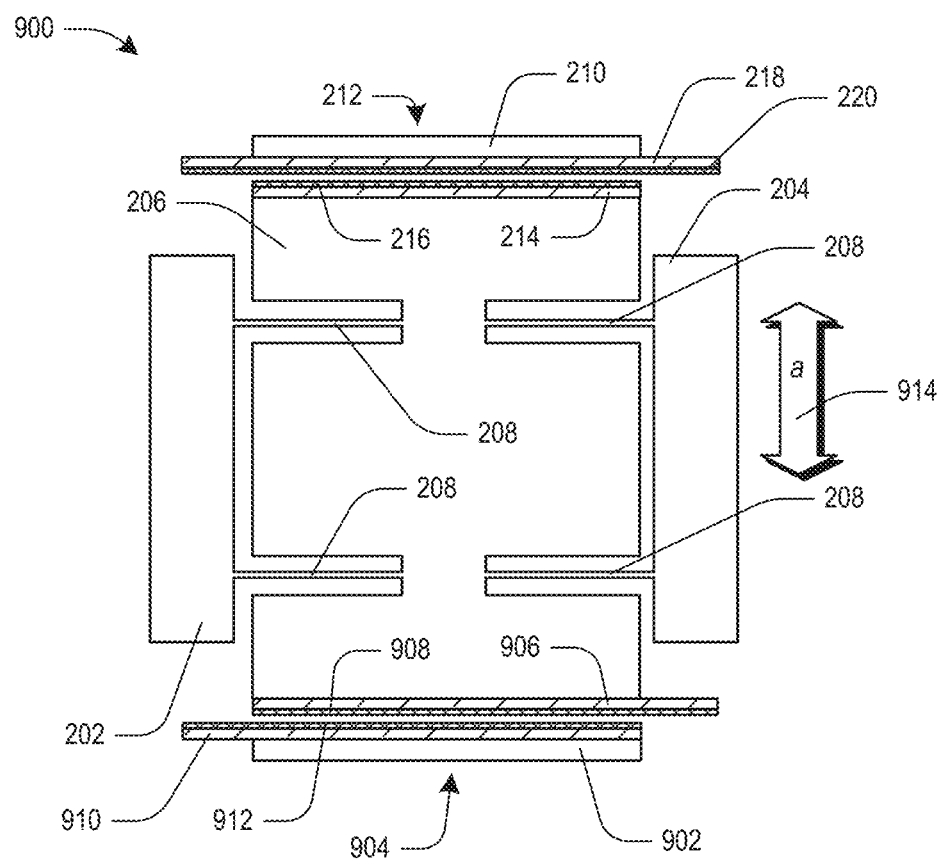
FIG. 9 is a diagram of a bi-directional variable capacitor, in accordance with some embodiments.

FIG. 9 is a diagram of a bi-directional variable capacitor 900, in accordance with some embodiments. The bi-directional variable capacitor 900 comprises a stationary member 902 adjacent the body member 206 and a second sensing unit 904. The sensing unit 904 comprises a third dielectric layer 906 over the body member 206 and a third conductive plate 908 over the third dielectric layer 906. A fourth dielectric layer 910 is over the stationary member 902 and a fourth conductive plate 912 is over the fourth dielectric layer 910. In some embodiments, the stationary member 902 comprises copper, or some other conductive material. In some embodiments, the dielectric layers 906, 910 comprise glass or some other dielectric material. In some embodiments, the conductive plates 908, 912 comprise gold or some other conductive material. In some embodiments, the conductive plates 908, 912 are spaced apart, such as by an air gap. A flexible dielectric material may be provided between the conductive plates 908, 912 that allows relative movement between the conductive plates 908, 912. The spacing between the conductive plates 908, 912 affects the capacitance of the sensing unit 904. A force 914 applied to the variable capacitor 900 changes the spacing between the conductive plates 216, 220 of the sensing unit 212 and the spacing between the conductive plates 908, 912 of the sensing unit 904 due to movement of the body member 206 relative to the stationary members 202, 204, 210, 902, as allowed by the springs 208. The springs 208 return the body member 206 to its initial state when the force 914 is no longer present. The sensing units 212, 904 facilitate the determination of the direction of the force 914 as well as its magnitude. Other structures and configurations of the variable capacitor 900 and the sensing units 212, 904 are within the scope of the present disclosure.

Figure 10A:
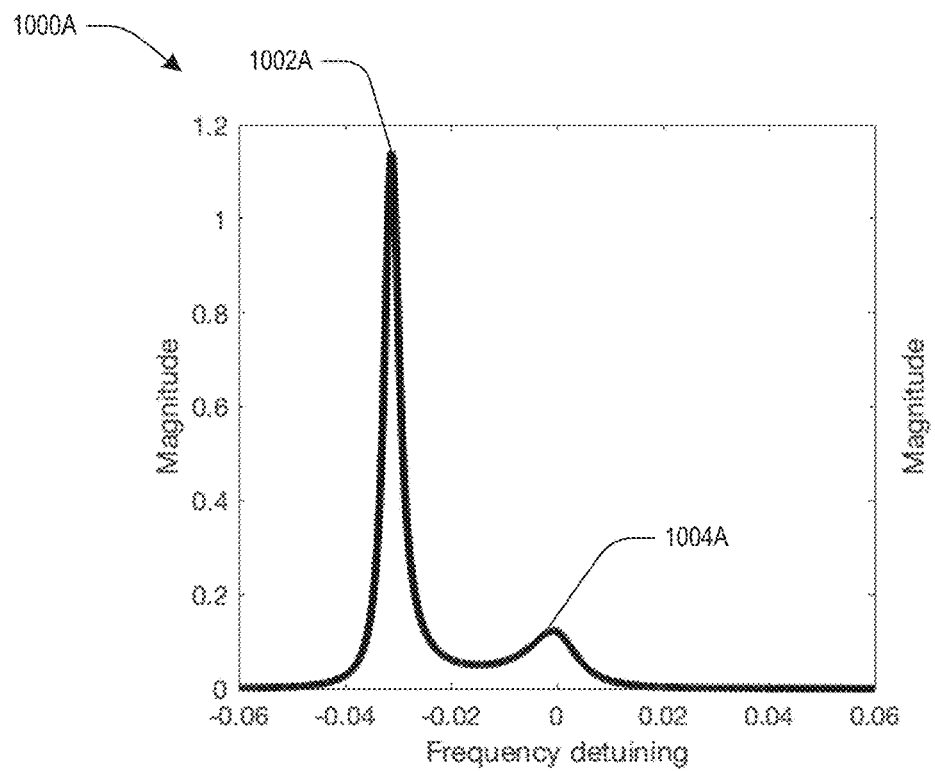
FIGS. 10A and 10B are diagrams illustrating sensor response, in accordance with some embodiments.
Figure 10B:
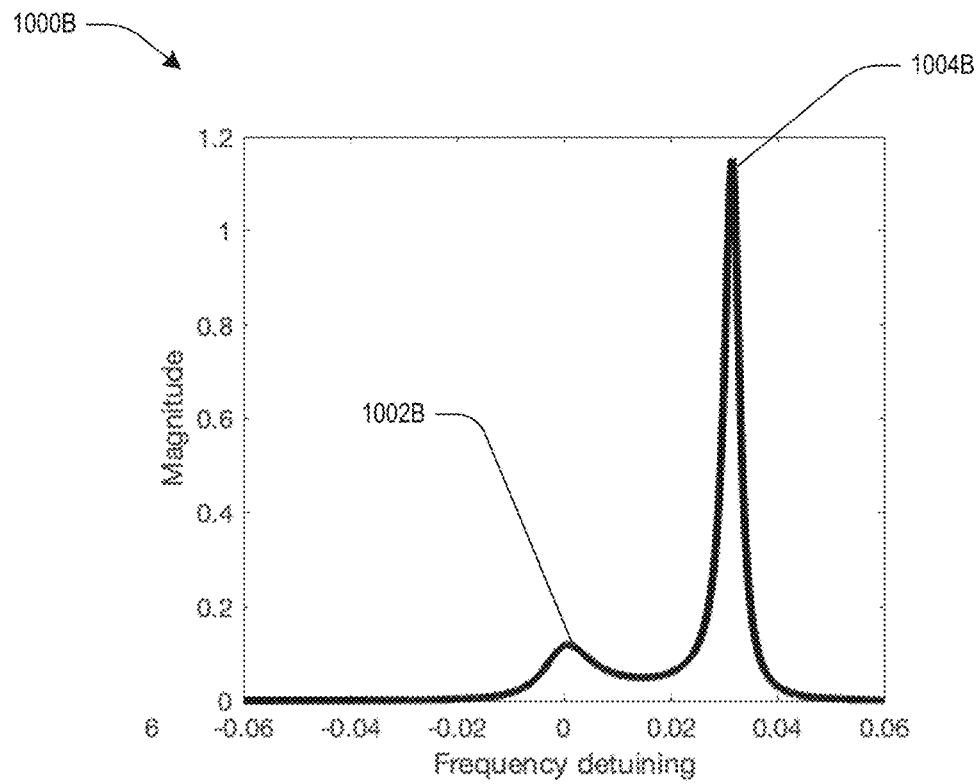

FIGS. 10A and 10B are diagrams illustrating a sensor response, in accordance with some embodiments. FIG. 10A is a curve 1000A illustrating the response for a transmission peak degeneracy with a positive force applied to the variable capacitor 900. The difference between the frequencies of the frequency peaks 1002A, 1004A is related to the applied force, and the difference between the amplitudes 1002A, 1004A is related to the direction of the applied force. FIG. 10B is a curve 1000B illustrating the response for a transmission peak degeneracy with a negative force applied to the variable capacitor 900. The difference between the frequencies of the frequency peaks 1002B, 1004B is related to the applied force, and the difference between the amplitudes 1002B, 1004B is related to the direction of the applied force. Note that for a positive applied force, the peak 1002A has an amplitude greater than the peak 1004A, and for a negative applied force, the peak 1002B has an amplitude less than the peak 1004B.

Figure 11:
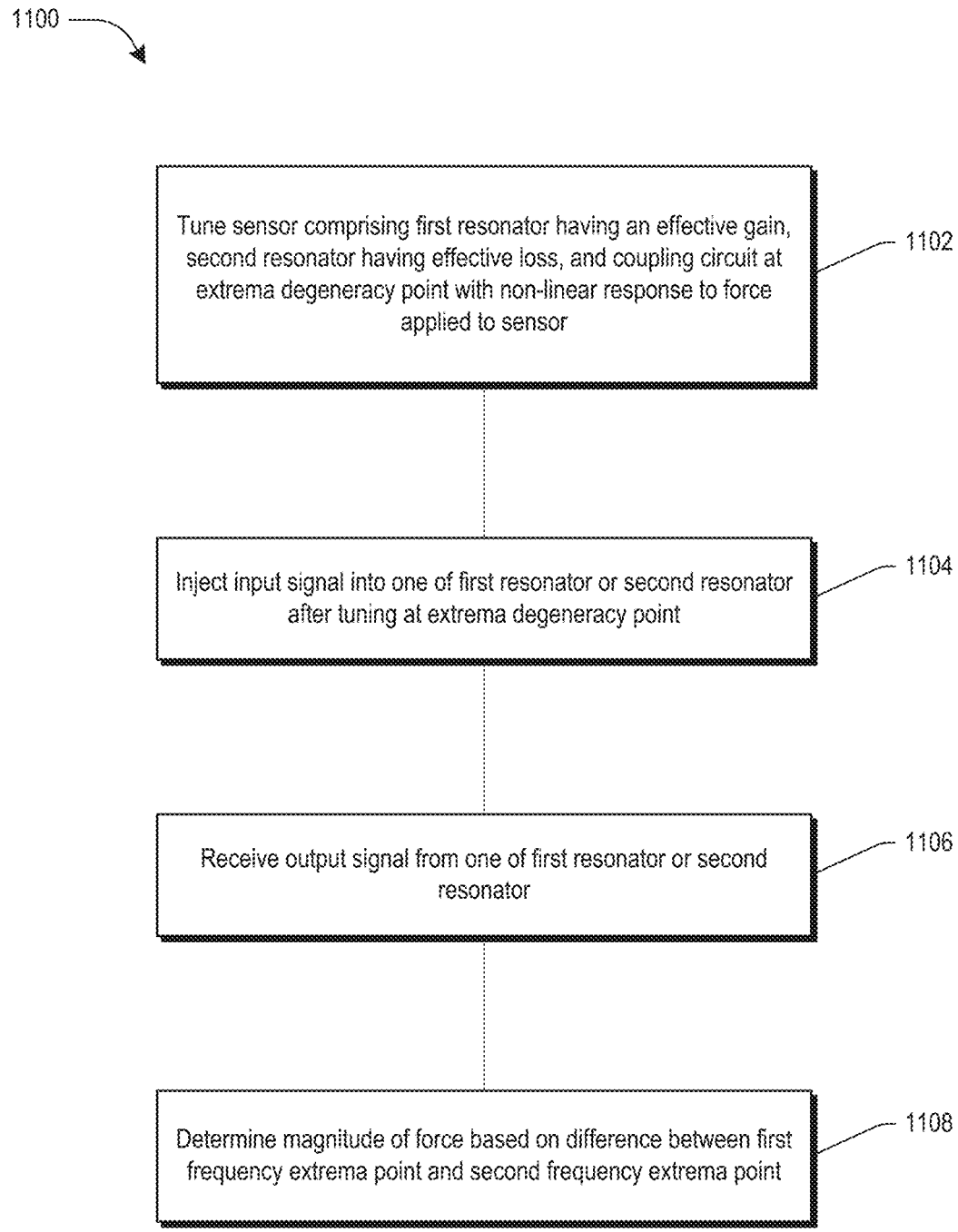
FIG. 11 is a diagram illustrating a method for sensing a force, in accordance with some embodiments.

FIG. 11 is a diagram illustrating a method for sensing a force, in accordance with some embodiments. At 1102, a sensor comprising a first resonator having an effective gain, a second resonator having an effective loss, and a coupling circuit connected between the first resonator and the second resonator is tuned at an extrema degeneracy point with a non-linear response to the force. At least one of the first resonator, the second resonator, or the coupling circuit comprises a variable capacitor has a capacitance that varies as a function of a force applied to the variable capacitor. At 1104, an input signal is injected into one of the first resonator or the second resonator after the tuning. At 1106, an output signal is received from one of the first resonator or the second resonator. At 1108, a magnitude of the force is determined based on a difference between a first frequency extrema point and a second frequency extrema point of the output signal.

Figure 12:
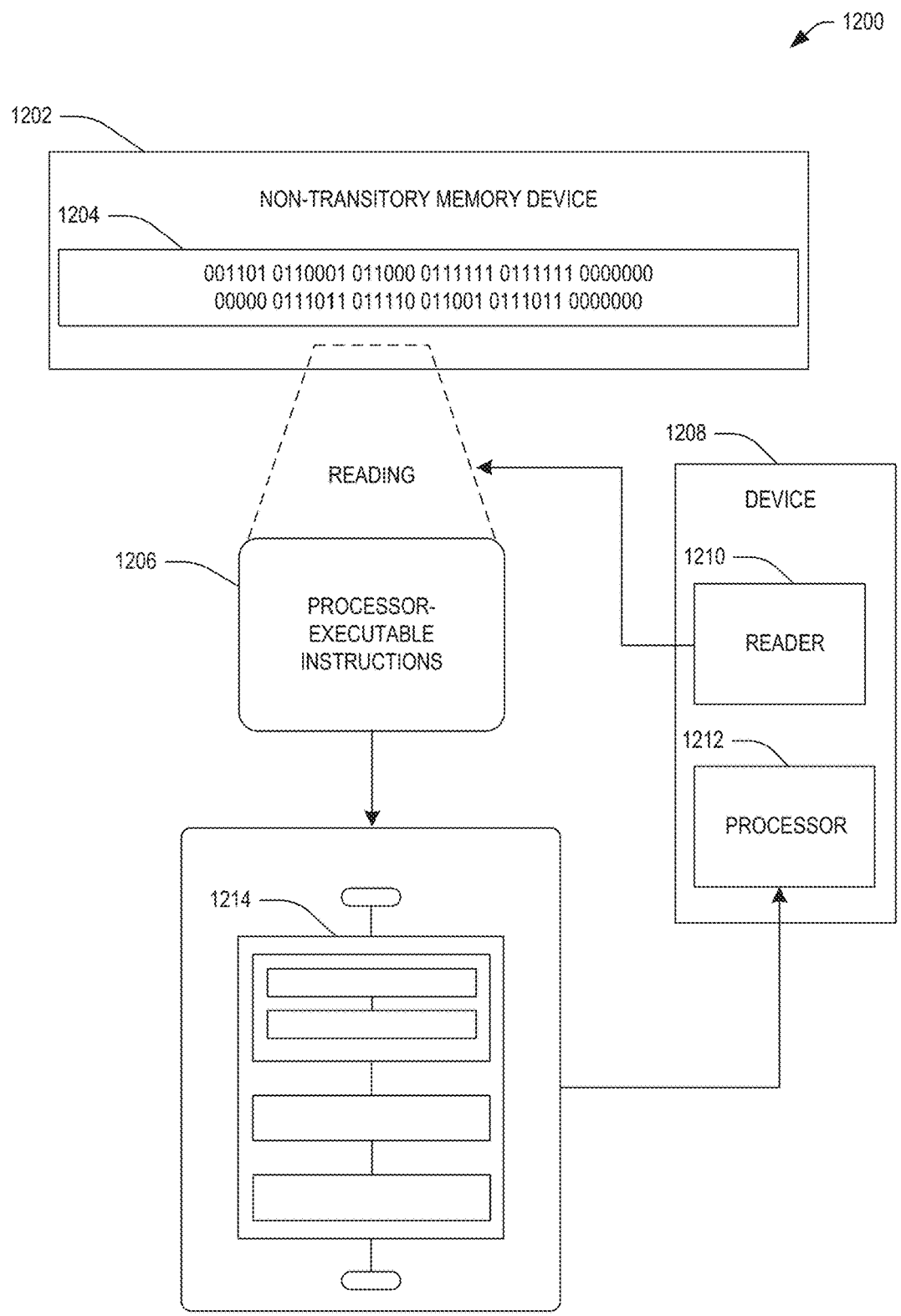
FIG. 12 illustrates an exemplary embodiment of a computer-readable medium, in accordance with some embodiments.

FIG. 12 illustrates an exemplary embodiment 1200 of a computer-readable medium 1202, in accordance with some embodiments. One or more embodiments involve a computer-readable medium comprising processor-executable instructions configured to implement one or more of the techniques presented herein. The embodiment 1200 comprises a non-transitory computer-readable medium 1202 (e.g., a CD-R, DVD-R, flash drive, a platter of a hard disk drive, etc.), on which is encoded computer-readable data 1204. This computer-readable data 1204 in turn comprises a set of processor-executable computer instructions 1206 that, when executed by a computing device 1208 including a reader 1210 for reading the processor-executable computer instructions 1206 and a processor 1212 for executing the processor-executable computer instructions 1206, are configured to facilitate operations according to one or more of the principles set forth herein. In some embodiments, the processor-executable computer instructions 1206, when executed, are configured to facilitate performance of a method 1214, such as at least some of the aforementioned method(s). In some embodiments, the processor-executable computer instructions 1206, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A sensor, comprising:
   a first resonator having an effective gain;
   a second resonator having an effective loss;
   a coupling circuit connected between the first resonator and the second resonator; and
   a processing unit, wherein:
      at least one of the first resonator, the second resonator, or the coupling circuit comprises a variable capacitor having a capacitance that varies as a function of a force applied to the variable capacitor; and
      the processing unit is configured to tune the first resonator and the second resonator at an extrema degeneracy point with a non-linear response to the force, inject an input signal into the first resonator or the second resonator after tuning the first resonator and the second resonator at the extrema degeneracy point, receive an output signal from the first resonator or the second resonator, the output signal having a first frequency extrema point and a second frequency extrema point, and determine a magnitude of the force based on a difference between the first frequency extrema point and the second frequency extrema point.

2. The sensor of claim 1, wherein:
   the processing unit is configured to receive the output signal from the first resonator when the second resonator receives the input signal;
   the processing unit is configured to receive the output signal from the second resonator when the first resonator receives the input signal; and
   the first frequency extrema point comprises a transmission peak.

3. The sensor of claim 1, wherein:
   the processing unit is configured to receive the output signal from the first resonator when the first resonator receives the input signal;
   the processing unit is configured to receive the output signal from the second resonator when the second resonator receives the input signal; and
   the first frequency extrema point comprises one of a reflectance peak or a reflectance deep.

4. The sensor of claim 1, wherein the degeneracy point comprises one of a transmission peak, a reflectance peak, or a reflectance deep.

5. The sensor of claim 1, comprising:
   a first capacitor coupled to the first resonator; and
   a second capacitor coupled to the second resonator.

6. The sensor of claim 1, wherein:
   the coupling circuit comprises at least one of a coupling capacitor or a coupling inductor.

7. The sensor of claim 1, wherein the variable capacitor comprises:
   a first stationary member;
   a body member;
   a first spring connecting the body member to the first stationary member;
   a first conductive plate mounted to a first edge of the body member;
   a second stationary member; and a second conductive plate mounted to the second stationary member and spaced apart from the first conductive plate.

8. The sensor of claim 7, comprising:
a first dielectric layer between the body member and the first conductive plate; and
a second dielectric layer between the second stationary member and the second conductive plate.

9. The sensor of claim 7, wherein:
the spring comprises a beam.

10. The sensor of claim 7, wherein:
the variable capacitor comprises:
a third conductive plate mounted to a second edge of the body member opposite the first edge;
a third stationary member; and
a fourth conductive plate mounted to the third stationary member and spaced apart from the third conductive plate; and
the processing unit is configured to determine a direction of the force based on the first frequency extrema point and the second frequency extrema point.

11. A method, comprising:
tuning a sensor comprising a first resonator having an effective gain, a second resonator having an effective loss, and a coupling circuit connected between the first resonator and the second resonator at an extrema degeneracy point with a non-linear response to a force applied to the sensor, wherein at least one of the first resonator, the second resonator, or the coupling circuit comprises a variable capacitor having a capacitance that varies as a function of the force;
injecting an input signal into one of the first resonator or the second resonator after tuning the sensor at the extrema degeneracy point;
receiving an output signal from one of the first resonator or the second resonator, the output signal having a first frequency extrema point and a second frequency extrema point; and
determining a magnitude of the force based on a difference between the first frequency extrema point and the second frequency extrema point.

12. The method of claim 11, comprising:
receiving the output signal from the first resonator when the second resonator receives the input signal; and
receiving the output signal from the second resonator when the first resonator receives the input signal, wherein:
the first frequency extrema point comprises a transmission peak.

13. The method of claim 11, comprising:
receiving the output signal from the first resonator when the first resonator receives the input signal; and
receiving the output signal from the second resonator when the second resonator receives the input signal, wherein:
the first frequency extrema point comprises one of a reflectance peak or a reflectance deep.

14. The method of claim 11, wherein tuning the sensor at the degeneracy point comprises:
tuning the sensor at one of a transmission peak, a reflectance peak, or a reflectance deep.

15. The method of claim 11, wherein the variable capacitor comprises:
a first stationary member;
a body member;
a first spring connecting the body member to the first stationary member;
a first conductive plate mounted to a first edge of the body member;
a second stationary member; and
a second conductive plate mounted to the second stationary member and spaced apart from the first conductive plate.

16. The method of claim 15, wherein:
the variable capacitor comprises:
a third conductive plate mounted to a second edge of the body member opposite the first edge;
a third stationary member; and
a fourth conductive plate mounted to the third stationary member and spaced apart from the third conductive plate; and
the method comprises:
determining a direction of the force based on the first frequency extrema point and the second frequency extrema point.

17. A non-transitory computer-readable medium, storing operations thereon that when executed by a processing unit cause the processing unit to:
tune a sensor comprising a first resonator, a second resonator, and a coupling circuit connected between the first resonator and the second resonator at an extrema degeneracy point with a non-linear response to a force applied to the sensor, wherein at least one of the first resonator, the second resonator, or the coupling circuit comprises a variable capacitor having a capacitance that varies as a function of the force;
inject an input signal into one of the first resonator or the second resonator after tuning the sensor at the extrema degeneracy point;
receive an output signal from one of the first resonator or the second resonator, the output signal having a first frequency extrema point and a second frequency extrema point; and
determine a magnitude of the force based on a difference between the first frequency extrema point and the second frequency extrema point.

18. The non-transitory computer-readable medium of claim 17, wherein the operations cause the processing unit to:
receive the output signal from the first resonator when the second resonator receives the input signal; and
receive the output signal from the second resonator when the first resonator receives the input signal, wherein:
the first frequency extrema point comprises a transmission peak.

19. The non-transitory computer-readable medium of claim 17, wherein the operations cause the processing unit to:
receive the output signal from the first resonator when the first resonator receives the input signal; and
receive the output signal from the second resonator when the second resonator receives the input signal, wherein:
the first frequency extrema point comprises one of a reflectance peak or a reflectance deep.

20. The non-transitory computer-readable medium of claim 17, wherein the operations for tuning the sensor at the degeneracy point comprise operations that:
tune the sensor at one of a transmission peak, a reflectance peak, or a reflectance deep.

* * * * *